United States Patent [19]
Noorlander

[11] Patent Number: 4,459,940
[45] Date of Patent: Jul. 17, 1984

[54] MILK COLLECTING SYSTEM FOR AUTOMATIC MILK APPARATUS

[76] Inventor: Daniel O. Noorlander, 508 West 630 South, Orem, Utah 84057

[21] Appl. No.: 374,518

[22] Filed: May 3, 1982

[51] Int. Cl.³ .............................................. A01J 7/00
[52] U.S. Cl. ................................ 119/14.54; 119/14.55
[58] Field of Search .............. 119/14.54, 14.55, 14.51, 119/14.08, 14.1

[56] References Cited
U.S. PATENT DOCUMENTS
2,425,873  8/1947  Gessler .............................. 119/14.55
3,373,761  3/1968  Flocchini ...................... 119/14.08 X FOREIGN PATENT DOCUMENTS
628174  9/1961  Canada ............................. 119/14.51

Primary Examiner—Hugh R. Chamblee
Attorney, Agent, or Firm—Terry M. Crellin

[57] ABSTRACT

A collector member for the vacuum hose lines and pulsator lines from the milking cups of an automatic milking machine is provided which permits connection of the vacuum hose lines to a milk line or milk pail such that milk never contacts any part of the collector member itself. The collector is advantageously used in a system in which the vacuum hose lines from the milking cups are attached to a multi-lumen milk hose with each hose line being connected to a respective lumen in the multi-lumen milk hose. The collector member is sufficiently weighted so as to provide desirable tension to the teats of the animal being milked. The collector provides a means for terminating the vacuum in the respective vacuum hose lines when the milking cups to which they are attached drop from the teat of the animal being milked. The vacuum terminating means comprises an elongate blunt element positioned adjacent to the hose lines as they emerge from the collector member such that when a milking cup falls from its respective teat on the animal being milked, the hose line on the fallen milk cup folds over the elongate blunt element to close the hose line. The collector advantageously allows the use of vacuum hoses made of silicon rubber which have useful lives some seven (7) times that of conventional rubber hose lines. Use of silicon rubber and elimination of milk contact with the collector member further greatly reduces bacteriological contamination which can cause mastitis in the animals being milked.

14 Claims, 19 Drawing Figures

MILK COLLECTING SYSTEM FOR AUTOMATIC MILK APPARATUS

BACKGROUND OF THE INVENTION

1. Field

The invention relates in general to a system for collecting milk from the teats of the animal being milked and transporting the milk through separate hose lines to a common milk line or pail. More particularly, the invention relates to a system employing hose lines made of silicone rubber and a novel collector member which brings the hose lines together and provides means for closing individual hose lines at the collector when a hose line and its respective milking cup fall from a teat of the animal being milked.

2. State of the Art

The construction and design of automatic milking apparatus has been recognized as a very important consideration in the dairy industry. Bacterial contamination of the milking machines contributes directly to mastitis, and much effort has been made in hygienic precautionary measures as well as in the design and construction of the milking apparatus.

Research has recently shown that potential habitats for bacteria not only include such areas as the underside of milk tube ferrules, rubber gaskets and other cracks and crevices between parts in conventional claws used in milking machines, but also include microhabitats created by microscopic surface cracks which exist in the rubber tubing and inflations used in the milking machines. The surface cracks of conventional rubber parts become more severe with usage. The use of silicone rubber inflations in automatic milking machines has recently become feasible. The use of silicone rubber for milk hose lines as well as for inflations is highly desirable, inasmuch as silicone rubber parts do not exhibit surface cracks as experienced with conventional rubber parts, and the potential habitats for bacterial propagation are greatly minimized. Silicone rubber parts do not exhibit surface cracks over their entire lifespan. Unfortunately, use of silicone rubber for the vacuum hose lines of the milking cups has not been feasible because the ferrules on the claws of the milking apparatus readily cut through the silicone rubber which is inherently susceptible to puncture and tear damage especially in areas where the silicone rubber is stressed.

It has been found that silicone rubber hose lines can be connected directly between the nipples on the milking cups and the milk pipe or pail. However, such a system is not practical. The separate hose lines required separate vacuum shut-off means as well as means to close off all vacuum hose lines simultaneously. The separate hose lines are cumbersome and subject to getting entangled and damaged, and a system of identifying corresponding hose lines and milking cups is needed to facilitate practical application of the milking cups to the animal being milked.

Even when fastidious hygienic procedures are followed to minimize bacterial contamination, mastitis is still a problem. It has been found that unstable vacuum variations occur within the milking cups of automatic milking apparatus. The unstable vacuum conditions can cause bacteria laden milk to flow backward in the vacuum hose lines. Under certain conditions, such as when one of the teats which are being milked has reached the end point of milking, milk can be forced backward into the teat by pressure differentials across the teat opening. This problem was discussed in U.S. Pat. No. 4,253,420, and, as explained therein, one way which has been tried to avoid the undesirable pressure variations and the return flow of milk contacting the tip of the teat is to provide an enlarged volume in a collecting piece. A quarter milking machine and a collecting piece for valving the four vacuum hoses from the milking cups are proposed in U.S. Pat. No. 4,253,420, wherein the collecting piece comprises metal rotating parts having alignment ports therein and ferrules for connection of the vacuum hoses thereto. The rotatable parts must be closely machined to maintain proper seal. Milk contacts the metal ferrules and parts in the collecting piece, and cracks and crevices are present to form a habitat for bacteria. Further, vacuum hose lines of silicone cannot be used with the collecting piece inasmuch as the ferrules puncture the silicone rubber material.

3. Objectives

A principal objective of the present invention is to provide a practical milking system which reduces the cyclic vacuum variations at the ends of the teats of the animal being milked and which otherwise occur due to opening and closing of the inflations of the other milking cups and by one or more milking cups falling from the teat of the animal.

A particular objective of the invention is to provide a system in which four separate milk channels are provided from the respective milking cups to the milk line or pail, with a novel collector member for collecting or bringing together the vacuum hose lines from the respective milking cups in closely spaced arrangement beneath the udder of the animal being milked.

A further objective of the invention is to provide a collector member which is associated with the vacuum hose lines from the milking cups so that the weight of the collector member is supported through the vacuum hoses and the milking cups by the teats of the animal being milked, but wherein the collector member has no milk contacting surfaces.

A further objective of the invention is to provide a collecting member which permits the use of silicone rubber vacuum hose lines and protects the hose lines from damage.

An additional objective of the invention is to provide a collector member which has no ferrules to puncture and harm silicone rubber tubing used as vacuum hose lines from the milking cups, with the collector member being provided with novel means for individually closing off the vacuum hose lines of milking cups which fall from a teat of the animal being milked.

An additional objective of the invention is to provide a collecting member which has means for simultaneously closing off the vacuum in all the vacuum hose lines to the milking cups.

A still further objective of the invention is to provide a milking system in which sanitation is promoted by using silicone rubber vacuum hoses which are very easily cleaned and which do not have surface cracks and irregularities to provide a habitat for bacteria.

SUMMARY OF THE INVENTION

The above objectives are achieved in accordance with the present invention by a novel system in which the milk from the individual milking cups is collected by individual vacuum hose lines preferably made of silicone rubber. The vacuum hose lines are collected or brought together beneath the udder of the animal being milked by a novel collector member. The collector member is associated with the vacuum hose lines so that the weight of the collector member is supported by the teats of the animal being milked by way of the vacuum hose lines and the milk cups attached to the teats of the animal. The weight of the collector is sufficient to provide the desirable, downward tension in the teats of the animal which enhances the withdrawal of milk from the teats.

The collector member has no milk contacting surfaces and, thus, presents no habitats particular thereto for bacterial propagation within the milk. The collector member comprises at least one passageway therein through which the vacuum hose lines pass in closely spaced relationship. An elongate blunt element is positioned on the collector member adjacent to the vacuum hose lines as they emerge from the collector member on their respective ways to the milking cups. When the milking cups on the respective hose lines are engaged with the teats of an animal being milked, the vacuum hose lines pass over the blunt element in a substantially open condition. But when one of the milking cups falls from its respective teat while at least one of the other milking cups is still engaged to a respective teat (so that the collector member is still supported by at least one of the teats beneath the udder of the animal being milked), the vacuum hose line on the fallen milk cup folds over the blunt element so as as to flatten and close off the vacuum in the hose line from the fallen milk cup. Closing off the vacuum to the fallen milk cup prevents intake of large volumes of air through the fallen milk cup which otherwise causes a large fluctuation in the pressure at the ends of the teats which are still being milked. In addition, closing off the vacuum prevents dirt and other foreign matter from being taken into the milk collecting system through the fallen milk cup. The blunt element preferably has an elongate round shape and is advantageously an elongate rod having a smooth curved surface. The vacuum hose lines are made of an elastomeric material, preferably silicone rubber, having sufficient resiliency so as to readily fold over the blunt element and to flatten out and close off the vacuum hose line when it folds over the blunt element.

The collector member does not have ferrules as are commonly used on conventional milk claws to puncture the silicone rubber hose lines. It has been found that silicone rubber hose lines are not damaged in any respect by being folded over the blunt element of the collector member. Thus, silicone rubber hose lines can be used and in fact are preferred. In fact one of the great benefits of the collector member of this invention is that it is completely compatible with vacuum hose lines made of silicone rubber.

The vacuum hose lines pass through the passageway in the collector member and there is no contact between milk in the vacuum hose lines and the collector member. The collector member advantageously further includes a releasable clamp means through which the collected vacuum hose lines also pass. The clamp means is adapted to simultaneously compress all the vacuum hose lines when the clamp means is activated and, thus, turn off the vacuum in all the vacuum hose lines in one operation.

The collector member also advantageously includes a manifold member having a plurality of nipples. One of the nipples is adapted to be connected to an air line of pulsating pressure, and the other nipples are adapted to be connected to pulsating air lines from the respective milking cups of the automatic milking machine.

As mentioned in U.S. Pat. No. 4,253,420, it has been found that unstable vacuum conditions in a common milk hose as is customarily used to deliver milk from the claw of conventional milking machines to the milk pipe or milk pail, can result in bacteria laden milk being forced backwardly into one or more teats of the animal being milked. The undesirable backup of milk in the vacuum hose lines can be substantially eliminated by maintaining separate and distinct vacuum hose lines from each milk cup to the milk line or milk pail. However, the separate hose lines require a complex vacuum shut off system which is adapted to shut off individual hose lines when necessary and to shut off all the hose lines simultaneously when desired. The separate hose lines additionally require a system of separating and identifying the individual vacuum hose lines to facilitate the practical application to the teats of the animal being milked. Further the separate hose lines were found to be cumbersome and impractical. With the collector member of the present invention, a practical system can be provided in which separate milk channels extend from the respective milking cups to the milk pipe or pail. The collector member brings the vacuum hose lines together in closely spaced arrangement beneath the udder of the animal being milked. The separate hose lines can then be banded together at spaced intervals along the length thereof between the collector member and the milk pipe or pail. Preferably, however, a multi-lumen hose is provided between the collector member and the milk pipe or pail, with an adapter to connect the individual vacuum hoses to respective lumens in the multi-lumen hose at the collector member. The multi-lumen hose arrangement will be more fully disclosed hereinafter in the detailed description of the preferred, illustrated embodiments.

Additional objects and features of the invention will become apparent from the following detailed description, taken together with the accompanying drawings.

THE DRAWINGS

Particular embodiments of the present invention representing the best mode presently contemplated of carrying out the invention are illustrated in the accompanying drawings in which.

DETAILED DESCRIPTION OF THE ILLUSTRATED EMBODIMENTS

Figure 1:
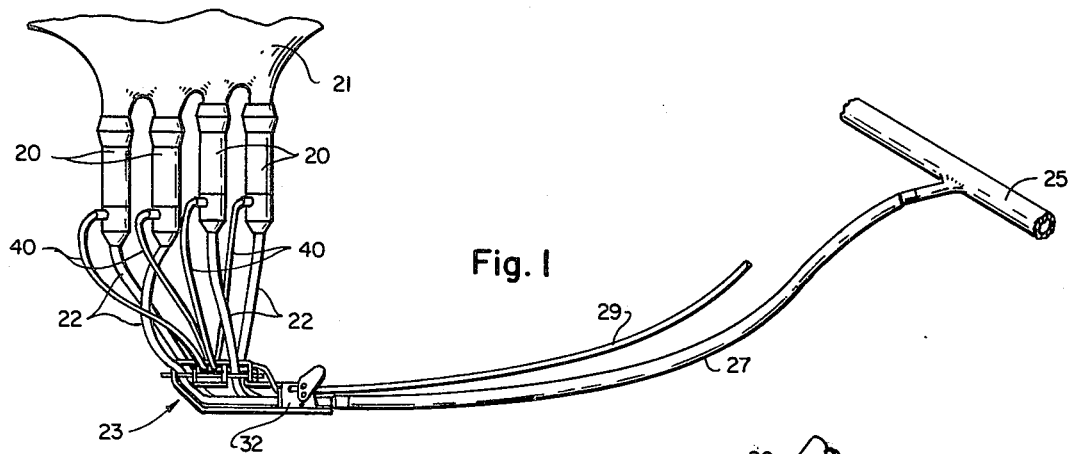
FIG. 1 is pictorial representation of milking machine apparatus in accordance with the present invention as it is attached to the udder of a cow.

A preferred embodiment of the invention is shown in the drawings and will be described hereinafter. The general milking system of the invention is shown in FIG. 1. The teat cup assemblies 20 as are well known in the art are shown attached to the teats of the udder 21 of a cow. The vacuum hose lines 22 hang downwardly from the teat cups 20 and are collected or brought together in closely spaced arrangement by the novel collector member (shown in FIG. 1 by the numeral 23) of the present invention. The construction of the collector member 23 which will be described in detail hereinafter is such as to provide sufficient weight which is important in providing adequate tension in the teats of the cow to facilitate opening of the teat lumen for maximum milk outflow. Generally, a weight of from about 2 to 6 pounds is preferable. The collector member 23 preferably includes a releasable clamp means 24, which, as will be described fully hereinafter, is adapted to simultaneously compress the vacuum hose lines when the clamp means is activated and, thus, close off the vacuum in the vacuum hose lines 22 to all the teat cup assemblies 20. The assembled hose lines 22 can be periodically banded together to form a somewhat unitary, multi-line conduit 27 which extends from the collector member to the milk pail or common milk pipe 25 as shown in FIG. 1. In the preferable embodiment as will be fully disclosed hereinafter, the four vacuum hose lines are preferably connected as they emerge downstream from the collector member to a 4-lumen milk hose which extends to and is attached to the milk pail or milk pipe 25 as shown in FIG. 1. A pulsating pressure line 29 extends from the source of pulsating vacuum (not shown) to the collector member 23, and as will be described hereinafter means are provided for distributing the pulsating vacuum to the teat cup assemblies 20.

The detailed description of the novel collector member of the present invention will be made in reference to FIGS. 2-9 of the drawings. As illustrated, the collector member comprises a body member shown generally by the numeral 26 which is formed from an elongate piece of metal plate or bar stock. The plate or bar stock preferably has a width of about 1½ to 3 inches and a thickness of from about 3/32 to ¼ inch. The plate or bar stock is bent to the shape shown in the drawings so as to have a substantially flat base 26a, an upstanding forward wall 26b, and a substantially flat top 26c extending substantially back over the flat base 26a from the forward wall 26b. The forward wall 26b can extend upwardly substantially normal to the flat base 26a or it can be inclined from the normal. In the preferred, illustrated embodiment, the forward wall comprises two sections. The first section extends upwardly and forwardly from the flat base 26a. The second section of the forward wall 26b then extends upwardly from the upper end of the first section substantially normal to the plane of the flat base 26a. As illustrated, the top 26c extends backwardly substantially parallel with and superimposed over the flat base 26a. The length of the flat base 26a is preferably between about 5 and 10 inches, with the top 26c extending backwardly a distance of about 2 to 6 inches. The height of the top plate 26c above the flat base 26a is preferably about 2.5 to 4.5 inches. The dimensions given herein for the collector member are for illustration purposes only, and the invention is not to be restricted in any way thereby.

The body member 26 preferably has a back wall 26d extending substantially downwardly from the top 26c a distance of about ½ the height of the top 26c above the flat base 26a. The flat base 26a, forward wall 26b, top 26c, and back wall 26d form a chamber through which the vacuum base lines 22 from the teat cups 20 pass and in which the vacuum hose lines 22 are collected or brought together in closely spaced arrangements.

Preferably, the collector member is provided with a plurality of passageways having openings through which respective vacuum hose lines 22 emerge from the collector member to extend to the milking cups 20. The plurality of passages combine internally of the collector to form a common passage into which the respective vacuum hose lines 22 are collected, with the common passage having an exit portal through which the downstream portions of the vacuum hose lines 22, which are collected together in the common passage, exit from the common passage in closely spaced, substantially parallel alignment.

In the illustrated embodiment, an insert member 28 is provided which is adapted to be received within the otherwise open space or chamber between the forward and back walls 26b and 26d and the top 26c and flat base 26a of the body member 26. The insert member 28 is further adapted to divide the open space or chamber into the plurality of passages through which the respective vacuum hose lines 22 pass. The insert member 28 is shown in isolation in FIGS. 6-8 and in place within the body member 26 in FIGS. 2-5. The insert member comprises a substantially flat wall 28a which is about the width of the metal plate or bar stock from which the body member 26 of the collector member is formed. The flat wall 28a extends from the downwardly projecting end of the back wall 26d to the forward wall 26b of the body member 26, so as to form an upper and lower passageway above and below the flat wall 28a in the otherwise open space or chamber between the back wall 26d and the forward wall 26b of the body member 26.

The flat wall 28a of the insert member is provided with a first pair of open cutouts 28b which are spaced at opposite sides of the flat wall 28a and adjacent to the back wall 26d of the body member 26. A second pair of open cutouts 28c are spaced at opposite sides of the flat wall 28a and are positioned adjacent to the forward wall 26b of the body member 26. The insert member 28 also includes a rear wall member 28d extending generally downwardly from the rear or back end of the flat wall 28a thereof. The rear wall member 28d extends to the flat base 26a of the body member 26, such that the rear wall member 28d forms a closure for the back end of the lower passageway formed below the flat wall 28a of the insert member 28. The rear wall member 28d is provided with a guide opening 28e, which as explained hereinafter accommodates the downstream ends of the vacuum hose lines 22 as they pass from the lower passageway formed beneath the flat wall 28a of the insert member 28.

A pair of upwardly extending guide plates or divider walls 28f and 28g, respectively, are provided extending from the top of the flat wall 28a of the insert member 28. The divider walls are spaced such that the first wall 28f is adjacent to the forward edge of the first pair of cutouts 28b and extends upwardly, transversely of the width of the insert member 28, to the top 26c of the body member 26. An open cutout or port 28h is provided in the upper central portion of the divider wall 28f, and a pair of holes 28i are provided adjacent the lower corners of the divider wall 28f. The purpose of the port 28h and the holes 28i will be discussed, hereinafter. The second divider wall 28g is positioned adjacent to the rear edge of the second pair of cutouts 28c and extends upwardly, transversely of the width of the insert member 28. The second divider wall 28g need not extend all the way to the top 26c of the body member 26. Preferably, the second divider wall 28g extends upwardly about ⅓ to ½ of the distance to the top 26c of the body member 26. A pair of holes 28j are provided adjacent the lower corners of the divider wall 28g and are in alignment with the holes 28i in the divider wall 28f. The purpose of the holes 28j will be discussed hereinafter. As can be seen from the drawings, the divider walls 28f and 28g are spaced apart between the first and second pair of coutouts 28b and 28c, so as to, as more fully discussed hereinafter, form guide channels for respective vacuum hose lines 22 and to provide an intermediate chamber between the guide channels to accommodate a manifold for the pulsating pressure line 29 as will also be more fully discussed hereinafter.

Figure 7:
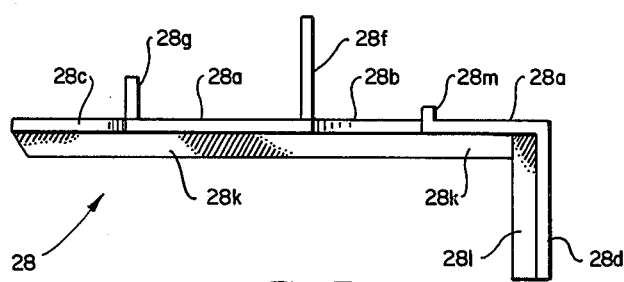
FIG. 7 is a side elevation of the insert member of FIG. 6.
Figure 8:
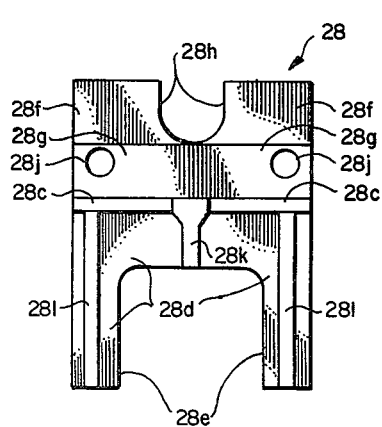
FIG. 8 is an end view of the insert member of FIG. 6 looking from the left end of FIGS. 6 and 7.

The insert member 28 can be made from molded polymeric material as well as from sheet metal. When made of a polymeric material, it is advantageous to provide a reinforcing rib on the underside of the flat wall 28a and a pair of reinforcing ribs on the inside of the rear wall chamber 28d. As shown in FIGS. 7 and 8, a central rib 28k can be molded to the underside of the flat wall 28a along the longitudinal axis of the flat wall 28a. A pair of upstanding ribs 28l can be molded to the inside surface of the rear wall member 28d adjacent to the opposite side edges thereof.

As mentioned previously, an elongate blunt element is provided on the collector member so that the individual vacuum hose lines 22 pass over the blunt element as they emerge from the collector member on their way to their respective teat cup assemblies. Preferably, the blunt element comprises an elongate rod or bar which is adjacent to the place where the vacuum hose lines emerge from the collector member. In the illustrated embodiment, the elongate blunt element comprises rods 30 which extend through the upper passageway above the flat wall 28a of the insert member 28 from the forward wall 26b to the back wall 26d of the body member 26. The rods or bars 30 are positioned adjacent to the respective open lateral sides of the upper passageway, with the bars 30 being substantially parallel to and spaced upwardly from the lateral edges, respectively, of the flat wall 28a.

In the illustrated embodiment, the rods or bars 30 are formed from a continuous length of bar or rod stock which is folded back over itself to form a pair of spaced, parallel legs. Two sets of aligned holes 26e are provided in the forward and back walls 26b and 26d, respectively, of the body member 26, and the holes 28i and 28j in the opposite sides of the insert member 28 are adapted to align with the respective sets of holes 26e in the body member 26. The respective legs 30 of the folded back bar or rod are received in the respective sets of aligned holes 26e, 28i and 28j. A ring or loop is formed at the front of the forward wall 26b of the body member 26 by the folded back portion of the rod or bar stock. This ring or loop is advantageously used to hang the milking apparatus on an appropriate hanging means during storage of the apparatus when it is not being used in the milking operation.

The free ends of the rods 30 are preferably threaded, and nuts 31 are engaged on the threaded ends which extend from the rearward surface of the back wall 26d of the body member 26. Thus, the rods 30 are firmly attached to the body members 26 and they in turn secure the insert member 28 in its proper place within the body member 26. A ridge or rib 28m can be provided across the upper surface of the flat wall 28a of the insert member 28, so that the ridge or rib 28m abuts the lower edge of the back wall 26d of the body member 26 when the insert is in its correct position.

The downstream ends of the vacuum hose lines 22 pass through the port 28h in the rear wall 28d of the insert members 28 in closely spaced, parallel arrangement, and, preferably in two sets of parallel lines, one set superimposed over the other as illustrated. The vacuum hose lines 22 pass through the lower passageway in the body member 26 below the flat wall 28a of the insert members 28, with mutually respective pairs of hose lines 22 passing through the respective cutouts 28b and 28c to the upper chamber above the flat wall 28a of the insert member 28.

Figure 2:
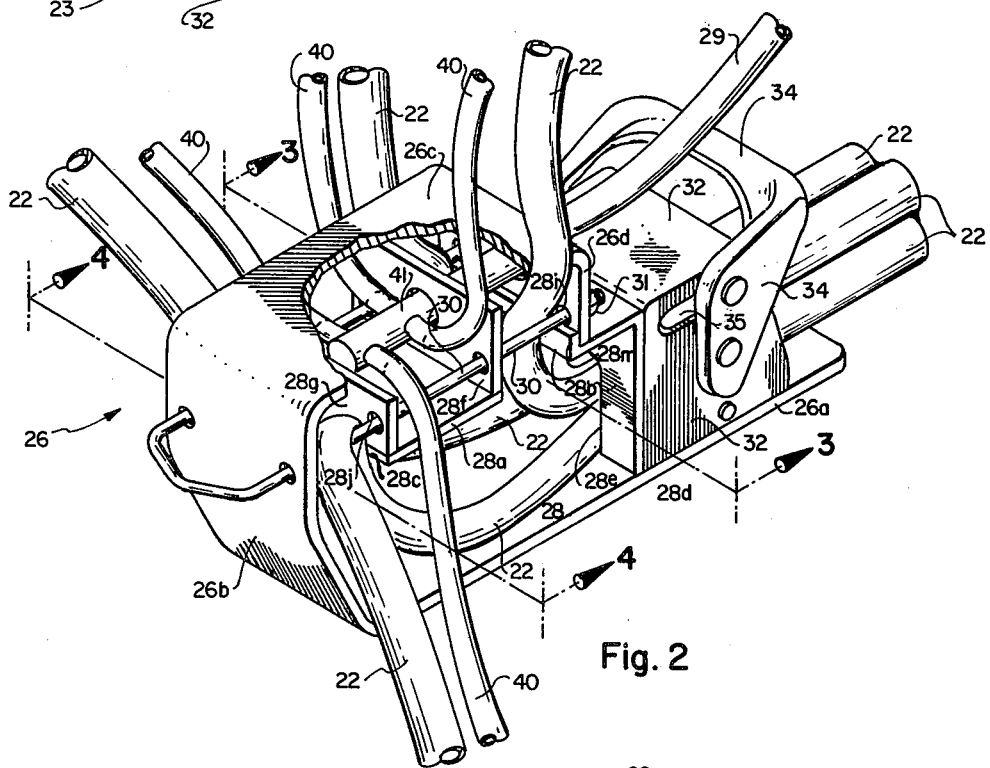
FIG. 2 is a pictorial view of the novel collector member of the present invention, showing the vacuum hose lines emerging therefrom with one of the vacuum hose lines in a fallen position such that it is closed off as it folds over the blunt element on the collector member.
Figure 3:
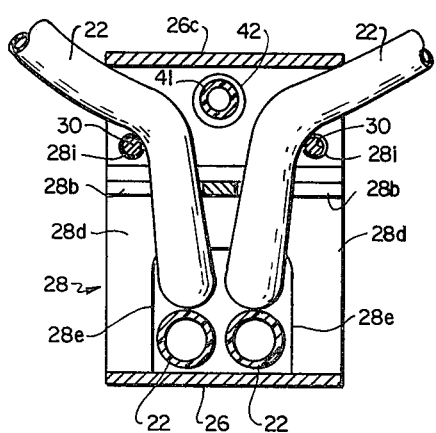
FIG. 3 is a fragmentary cross-sectional view taken along line 3—3 of FIG. 2 and showing two adjacent vacuum hose lines as they emerge from the collector member and pass over the blunt element in an open condition.

As shown in FIGS. 2 and 3, the upstream portion of the upper pair of hose lines passing through the port 28h in the rear wall 28d of the insert member 28 pass upwardly through the respective cutout openings 28b in the flat wall 28a of the insert member 28. This pair of hose lines 22 is then guided through a passage defined by the back wall 26d of the body member 26 and the divider wall 28f of the insert member 28, and the hose lines 22 emerge from the respective open lateral sides of the body member 26. In emerging from the body member 26 the hose lines 22 pass over the respective rods or bars 30. When the upstream ends of the hose lines are connected to teat cup assemblies 20 and the teat cup assemblies are engaged on the teats of a cow so that the body member 26 is suspended beneath the udder of the cow, the hose lines 22 pass over the rods 30 as shown in FIG. 3, with the hose lines 22 being open and unobstructed.

Figure 4:
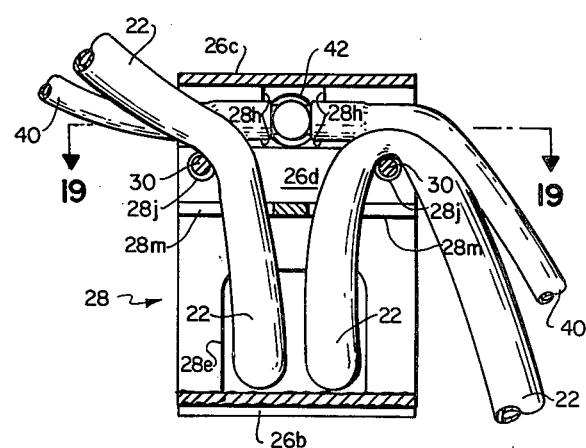
FIG. 4 is a fragmentary cross-sectional view taken along line 4—4 of FIG. 2 and showing two adjacent vacuum hose lines as they emerge from the collector member, with one of the vacuum hose lines being shown in a position folded back over the blunt element to flatten and close the hose line and with the other vacuum hose line passing over the blunt element in an open condition.
Figure 5:
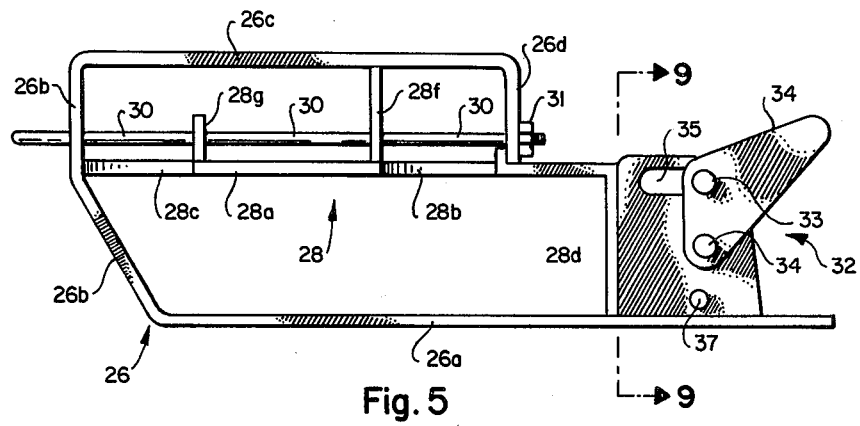
FIG. 5 is a side elevation of the collector member of FIG. 2, with the vacuum hose lines and the pulsating pressure lines omitted.
Figure 6:
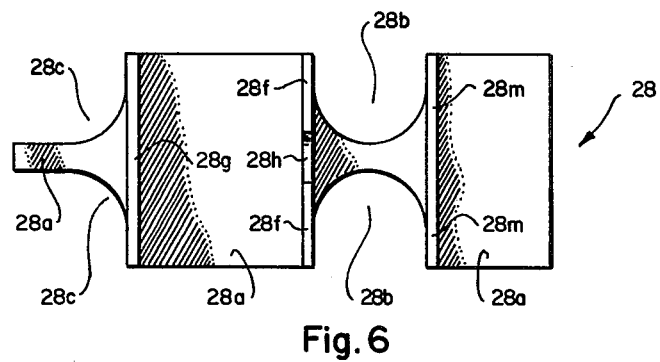
FIG. 6 is a top view of the insert member shown separated from the remainder of the collector member.

As shown in FIGS. 2 and 4, the upstream portion of the lower pair of hose lines passing through the port 28h in the rear wall 28d of the insert member 28 pass upwardly through the respective cutout openings 28c in the flat wall 28a of the insert member 28. This pair of hose lines 22 is then guided through a passage defined by the forward wall 26b of the body member 26 and the divider wall 28g of the insert member 28, and the hose lines 22 emerge from the respective open lateral sides of the body member 26. In emerging from the body member 26, the hose lines 22 pass over the respective rods or bars 30. In FIG. 4, the left-hand hose line 22 is shown in its normal operating position when the teat cup at the end of the hose line is engaged on a teat of a cow. The hose line 22 then passes over the rod 30 as shown in FIG. 4, with the hose line 22 being open and unobstructed.

When one of the teat cups falls from the teat of the cow and at least one other teat cup is still engaged with a teat, so that the collector member remains suspended beneath the udder of the cow, the hose line 22 of the fallen teat cup will pass over the rod 30 as shown by the right hand hose line 22 of FIG. 4. The teat cup hangs down from the collector member and the hose line is folded back over the rod 30 so as to flatten and close or substantially obstruct the fallen hose line. This cuts off the constant vacuum from the fallen teat cup and prevents intake of large volumes of air and dirt by the fallen teat cup. Any one of the hose lines 22 will assume the same relative position with respect to the rod 30 as shown by the right hand hose line 22 of FIG. 4 whenever its corresponding teat cup falls from the teat of the cow and at least one of the other teat cups of the apparatus is still engaged to a teat on the cow.

Figure 9:
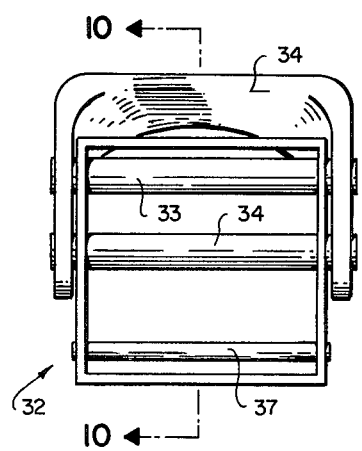
FIG. 9 is an end elevation view of the clamp means taken along line 9—9 of FIG. 5.
Figure 10:
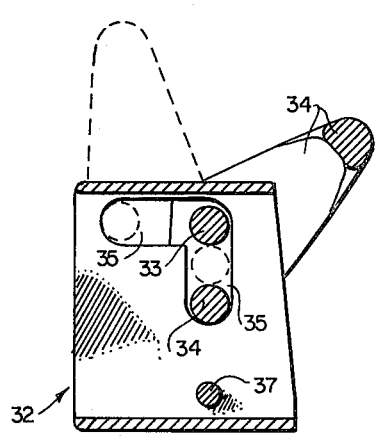
FIG. 10 is a vertical cross-sectional view through the clamp means taken along the line 10—10 of FIG. 9.
Figure 11:
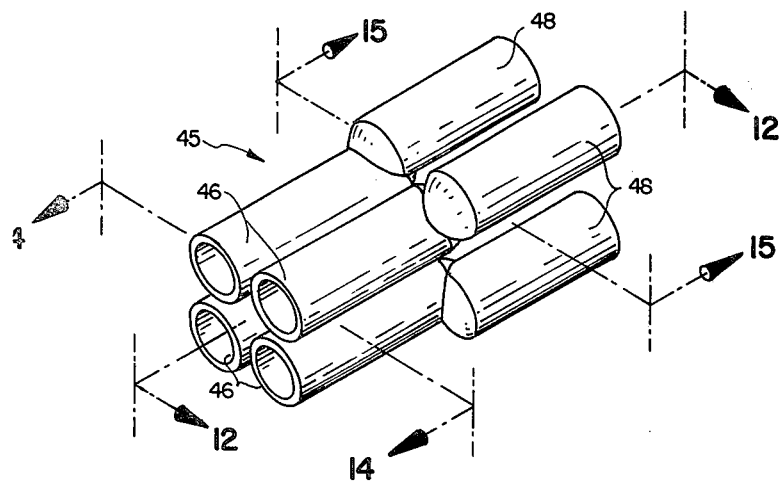
FIG. 11 is a pictorial view of the connector for attaching the vacuum hose lines at the collector member to the multi-lumen hose.
Figure 12:
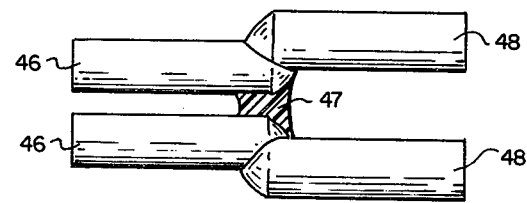
FIG. 12 is a cross-sectional view through the connector of FIG. 11 taken along line 12—12 of FIG. 11.
Figure 13:
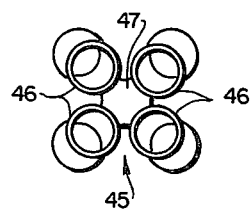
FIG. 13 is an end view of the connector of FIG. 10 looking from the left end of the connector in FIG. 11.

The collector member of the present invention is also advantageously provided with a releasable clamp means which is adapted to simultaneously compress all the vacuum hose lines 22 when the clamp means is activated. That way, the vacuum in all the vacuum hose lines 22 is turned off. As illustrated in the drawings, a clamp member 32 is mounted on the rear portion of the flat base 26a of the body member 26 and downstream of the rear wall member 28d of the insert member 28. The vacuum hose lines 22 downstream of the port or guide opening 28e in the rear wall member 28d pass through the clamp member 32. As illustrated in FIGS. 9 and 10 the clamp member 32 comprises a pair of parallel rollers or rods 33 and 34 whose ends are attached to a handle 36. The rods 33 and 34 move in a pair of L-shaped slots 35 in the side plates of the clamp member 32. As the handle 36 moves forward as shown by dotted lines in FIG. 10, the roller 33 moves forward and the other roller 34 moves upward. As the motion of the handle reverses, so does the motion of the rollers 33 and 34. A stationary rod or bar 37 is positioned below the lower ends of the vertical portion of the L-shaped slots, so that when the handle 36 is moved backward so as to force the roller 34 to move downwardly, the hose lines, which pass between the roller 34 and stationary rod or bar 37, are squeezed and compressed so as to close or obstruct the hose lines. When the handle 36 is moved forward and the roller 34 moves upwardly, the hose lines expand to their open unobstructed condition.

Figure 19:
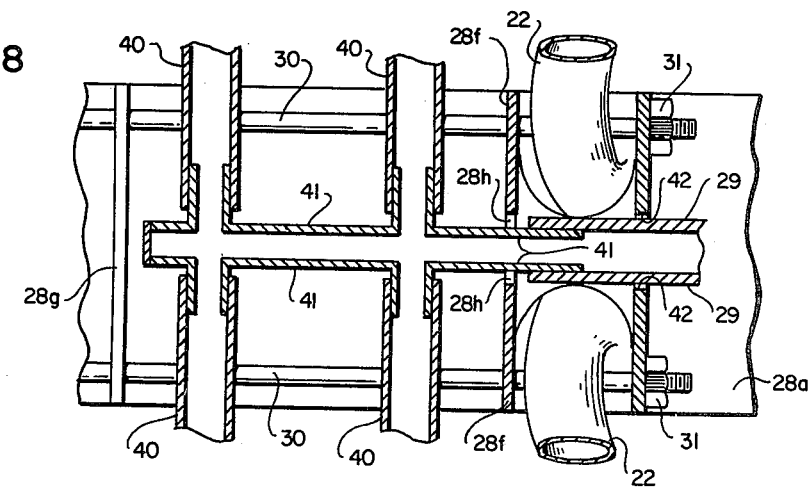
FIG. 19 is a fragmentary cross-sectional view of the pulsating pressure manifold system as taken along line 19—19 of FIG. 4.

A manifold system is also advantageously provided with the collector members of the present invention for providing a source of pulsating vacuum from the pulsating pressure line 29 to the appropriate pulsating hoses 40 to be attached to the teat cup assemblies 20. Referring in particular to FIGS. 4 and 19, a manifold member comprising an elongate tube 41 is positioned within the space between the pair of guide plates or divider walls 28g and 28f. A porthole 42 is provided in the back wall 26d of the body member 26, and the porthole 42 is in alignment with the port 28h in the guide plate or divider wall 28f of the insert member 28. One end of the tube 41 is sealed and the other open end is received in the port 28h in alignment with the porthole 42 in the body member 26. The open end of the tube 41 is adapted to be connected to the pulsating pressure line 29. The end of the pulsating pressure line 29 fits through the porthole 42 in the body member 26 and is slidingly connected to the open end of the tube 41.

The portion of the tube 41 which is positioned between the guide plates or divider walls 28f and 28g have four nipples communicating therewith and extending outwardly therefrom toward the open sides of the body member 26. The nipples are adapted to be connected to the pulsating air hoses 40 from the respective teat cups assemblies of the milking machine. The tube 41 and attached nipples are advantageously molded as a unit from a rigid polymeric material. The advantage of having the guide plate or divider wall 28g only extend upwardly by ⅓ to ½ the distance between the flat wall 28a of the insert member 28 and the top 26c of the body member 26 is to allow positioning of the tube 41 within the body member 26 and between the guide plate or divider walls 28f and 28g.

As mentioned previously, the vacuum hose lines 22 which have been collected by the collector member can be banded together at spaced intervals so as to form a somewhat unitary conduit from the collector member to the milk pail or common milk pipe. In the preferred embodiment, as illustrated, a multi-lumen milk hose and a connector member are provided. The connector member is adapted to connect the collected, downstream ends of the vacuum hose lines adjacent to the collector member to one end of the multi-lumen milk hose, with each vacuum hose line being connected to a respective lumen in the multi-lumen milk hose. The multi-lumen hose has a minimum length of one meter, and the other end of the multi-lumen hose is adapted to be connected to a common milk pipe or to a milk pail. The minimum length of the multi-lumen milk hose has been found to be important to prevent unstable pressure variations within the individual lumens which can be caused by pulsating inflations associated with another lumen especially after one of the teats being milked has reached the end point of the milking for that teat. The minimum length of multi-lumen hose from the source of common vacuum to the collector member greatly reduces the cyclic variations in the vacuum milk hoses 22 caused by the opening and closing of inflations in the teat cup assemblies, and has been found to sufficiently stabilize the otherwise unstable vacuum conditions at the teats such as to prevent milk being backed up against a teat. The minimizing of the chances of milk being backed up against a teat and forced into a teat at the end of that teat's milking has greatly reduced one cause of mastitis occurring in animals on which automatic milking machines are used.

The multi-lumen hose can be merged into a single lumen connecting hose line which is then connected to the common milk line or to a milk pail. The single-lumen connecting hose line should not be longer than about 9 centimeters, and is used just as a connector to the common milk line or to the milk pail.

Figure 18:
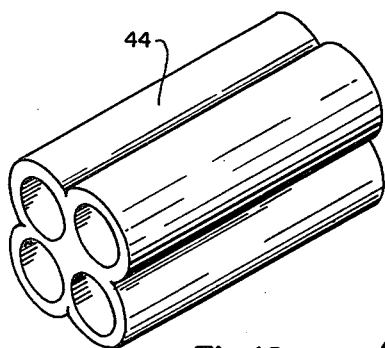
FIG. 18 is a pictorial of the end portion of a 4-lumen hose line which can be advantageously used with the invention.

A pictorial view of the end portion of a 4-lumen hose 44 which is used in milking animals having 4 teats, such as cows, is shown in FIG. 18. The 4-lumen hose 44 is made of an extruded material, preferably silicone rubber. The centers of the 4 lumens are spaced equally so that the centers become the corners of a square when the hose is viewed in cross section.

Figure 14:
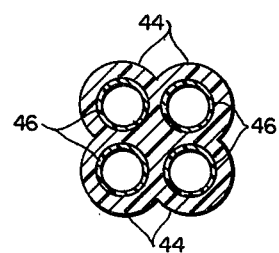
FIG. 14 is a cross-sectional view taken along line 14—14 of FIG. 12 additionally showing the connection of a 4-lumen hose line to the connector.
Figure 15:
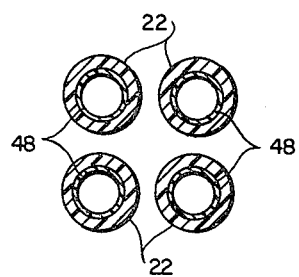
FIG. 15 is a cross-sectional view taken along line 15—15 of FIG. 12 additionally showing the four separate vacuum hose lines attached to the connector.

The 4-lumen hose is connected to the vacuum hose lines adjacent to but downstream from the clamp member 32 of the collector member by an adapter 45 shown in FIGS. 11–15. The adapter 45 comprises 4 cylindrical nipples 46 spaced in a square configuration so that the mutually respective nipples 46 of the adapter 45 are adapted to be received into the respective lumens of the 4-lumen hose 44 as shown in FIG. 14. The nipples 46 are united together and held in fixed position by an interconnecting web 47 which is molded integrally with the nipples 46. Four additional cylindrical nipples 48 are provided with each additional nipple 48 being connected in flow communication with a respective nipple 46. The additional nipples 48 are, however, spaced outwardly diagonally from the nipples 46 so that the nipples 48 are spaced apart from each other slightly further than are the nipples 46. This allows space for connection of the individual vacuum hose lines 22 to the respective nipples 48 as shown in FIG. 15. The entire adapter 45 is preferably molded as an integral unit from a rigid polymeric material.

Figure 16:
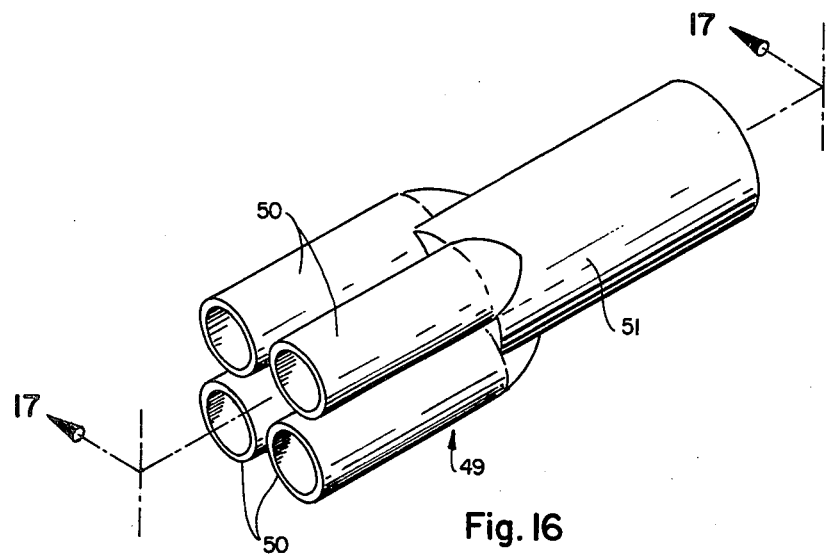
FIG. 16 is a pictorial view of the connector for attaching the multi-lumen hose to a single lumen hose.
Figure 17:
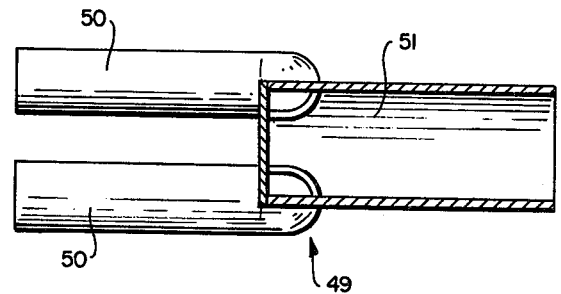
FIG. 17 is a cross-sectional view through the connector of FIG. 16 taken along line 17—17 of FIG. 16.

On the other end of the 4-lumen hose there is provided an adapter for merging the 4 lumens into a single lumen which is then connected to a common milk line or pipe or to a milk pail. The latter adapter 49 is shown in FIGS. 16 and 17. The adapter 49 comprises 4 cylindrical nipples 50 spaced in a square configuration so that the mutually respective nipples 50 of the adapter 49 are adapted to be received into the respective lumens of the 4-lumen hose 44 in a similar manner as the nipples 46 of adapter 45. Mutually respective ends of the nipples 50 of adapter 49 are attached for flow communication to a common nipple 51. The nipples 50 are attached around the periphery of the common nipple 51, and the common nipple thus unites the nipples 50 together in a fixed position. The nipple 51 is adapted to be connected to a common milk pipe or milk pail either directly or through a short single-lumen connecting hose. When such a short, single-lumen connecting hose is used, its length should be no greater than about 9 centimeters. The end of the nipple 51 to which the nipples 50 are attached is otherwise closed so that flow from the nipples 50 must traverse through the nipple 51. The entire adapter 49 is preferably molded as an integral unit from a rigid polymeric material.

Although a preferred embodiment of the apparatus has been illustrated and described, it is to be understood that the present disclosure is made by way of example and that various other embodiments are possible without departing from the subject matter coming within the scope of the following claims, which subject matter is regarded as the invention.

I claim:

1. A collector member for collecting or bringing together in closely spaced arrangement the vacuum hose lines attached to individual milking cups of an automatic milking machine, said collector member comprising a body member having at least one passageway therein through which all the individual, collected vacuum hose lines pass in closely spaced side-by-side relationship; at least one elongate blunt element positioned adjacent to the vacuum hose lines as they emerge from said collector member on their respective ways to said milking cups, said elongate blunt element being so positioned that when the respective milking cups on the vacuum hose lines are engaged with the teats of an animal being milked, said vacuum hose lines pass over the elongate blunt element in a substantially open condition, and when a milking cup falls from its respective teat of the animal being milked while at least one of the other milking cups is still engaged with its respective teat, the vacuum hose line on the fallen milking cup folds over said elongate blunt element so as to flatten and close the vacuum hose line as it folds over the elongate blunt element.

2. A collector member as claimed in claim 1, wherein the collector member further includes a releasable clamp means which is adapted to simultaneously compress the vacuum hose lines when the clamp means is activated and, thus, turn off the vacuum in the vacuum hose lines to all the milking cups.

3. A collector member as claimed in claim 1 further including a manifold member which has a plurality of nipples, one of said nipples being adapted to be connected to an air line of pulsating pressure, with the other nipples being adapted to be connected to pulsating air lines connected to the respective milking cups of the automatic milking machine.

4. A collector member as claimed in claim 1, wherein a plurality of passageways are provided in the collector member, said passageways having openings from said collector member through which respective vacuum hose lines emerge from said collector member to extend to said milking cups, said plurality of passages combining internally of said collector to form a common passage into which are collected the respective vacuum hose lines from the plurality of passageways, said common passage having an exit portal through which the downstream portions of the vacuum hose lines collected in said common passage exit from said common passage in closely spaced, substantially parallel alignment.

5. A collector member as claimed in claim 1, further including in combination a multi-lumen milk hose and a connector member which is adapted to connect the collected, downstream ends of the vacuum hose lines to one end of said multi-lumen milk hose, with each vacuum hose line being connected to a respective lumen in said multi-lumen milk hose.

6. The combination as claimed in claim 5, wherein the multi-lumen hose has a minimum length of one meter, and the other end of said multi-lumen milk hose is adapted to be connected to a common milk line or to a milk pail.

7. The combination as claimed in claim 5, wherein the multi-lumen hose has a minimum length of one meter, and said combination further includes a single lumen milk line and an adapter which is adapted to connect one end of the single lumen milk line to the other end of said multi-lumen milk hose, wherein the single lumen milk line is no longer than about nine centimeters and is adapted to be connected at its other end to a common milk line or to a milk pail.

8. A collector member as claimed in claim 5, wherein the blunt element comprises an elongate rod or bar.

9. A collector member as claimed in claim 1, wherein the body of the collector member is formed from an elongate piece of metal plate or bar stock which is bent to shape so as to have a substantially flat base, an upstanding forward wall, a substantially flat top extending substantially back over said flat base from the forward wall and a back wall extending substantially downwardly from said flat top toward said flat base with the downwardly extending end of said back wall being spaced from said flat base; an insert member is provided which is adapted to be received within the otherwise open space between the forward and back walls and the top and flat base, said insert member having a substantially flat wall which is about the width of the metal plate or bar stock from which the body of the collector member is formed, with said flat wall extending from the downwardly projecting end of said back wall to the forward wall so as to form an upper and lower passageway in said open space above and below said flat wall; a first and second pair of open cutouts in said flat wall which provide guide passages between the upper and lower passageways, said first pair of open cutouts being spaced at opposite sides of said flat wall and adjacent to said back wall and said second pair of open cutouts being spaced at opposite sides of said flat wall and adjacent to said forward wall; and said blunt elements comprise two bars or rods which extend through said upper passageway from said forward wall to said back wall adjacent to the respective open lateral sides of said upper passageway with said bars or rods being substantially parallel to and spaced upwardly from the lateral edges, respectively, of said flat wall, whereby said vacuum hose lines pass through said lower passageway in closely spaced relationship, with individual vacuum hose lines passing from the lower passageway to the upper passageway through the respective guide passages in said flat wall of said insert member and with the vacuum hose lines then emerging from the collector member through the open lateral sides of said upper passageway so that said vacuum hose lines pass individually over one of the respective bars or rods as they emerge from the collector member.

10. A collector member as claimed in claim 9, wherein said insert member further includes a rear wall member extending generally downwardly from the back end of said flat wall to said flat base, such that said rear wall member forms a closure for the back end of said lower passageway, said rear wall member having a guide opening therein through which the downstream ends of the vacuum hose lines pass from said lower passageway.

11. A collector member as claimed in claim 10, wherein said flat base extends backwardly from said rear wall member of said insert member and a releasable clamp means is mounted on the extending portion of said flat base, said releasable clamp means being adapted to simultaneously compress the vacuum hose lines when the clamp means is activated and thus turn off the vacuum in the hose lines to all milking cups.

12. A collector member as claimed in claim 11 wherein a pair of guide plates extends upwardly from said flat wall toward said flat top of said collector member, said pair of guide plates being spaced apart between the first and second pair of cutouts in said flat wall, whereby said pair of guide plates form guide channels for respective vacuum hoses extending through said first and second pairs of cutouts.

13. A collector member as claimed in claim 12, wherein said bars or rods comprising said blunt elements are formed from a continuous length of bar or rod stock which is folded back over itself to form a pair of spaced, parallel legs; two sets of aligned holes are provided in said forward and back walls of said collector member and in the guide plates on said insert member, whereby said legs of the folded back bar or rod are received in the respective aligned holes.

14. A collector member as claimed in claim 12, wherein a porthole is provided in said back wall of said collector member; an open port is provided in the guide plate of said pair of guide plates which is adjacent to said second pair of open cutouts in said insert member, said open port being in alignment with said porthole in said back wall; and a manifold member comprising an elongate tube extends from the space between said pair of guide plates through said aligned open port and porthole, with the free end of said tube which extends from said porthole being adapted to be connected to an air line of pulsating pressure, and with the portion of said tube which is located between said pair of guide plates having a plurality of nipples extending outwardly therefrom toward the open sides of said collector member, said nipples being adapted to be connected to the pulsating air lines from the respective milking cups of the automatic milking machine.

* * * * *